(12) United States Patent
Golov

(10) Patent No.: US 11,155,209 B2
(45) Date of Patent: Oct. 26, 2021

(54) VIRTUAL MIRROR WITH AUTOMATIC ZOOM BASED ON VEHICLE SENSORS

(71) Applicant: Micron Technology, Inc., Boise, ID (US)

(72) Inventor: Gil Golov, Backnang (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/548,705

(22) Filed: Aug. 22, 2019

(65) Prior Publication Data

US 2021/0053489 A1 Feb. 25, 2021

(51) Int. Cl.
| | |
|---|---|
| *B60R 1/00* | (2006.01) |
| *G06T 7/70* | (2017.01) |
| *G06T 7/50* | (2017.01) |
| *G06T 7/20* | (2017.01) |
| *H04N 5/225* | (2006.01) |
| *H04N 5/247* | (2006.01) |
| *H04N 5/232* | (2006.01) |
| *B60R 11/04* | (2006.01) |
| *G06K 9/00* | (2006.01) |
| *B60R 11/00* | (2006.01) |
| *B60R 1/12* | (2006.01) |

(52) U.S. Cl.
CPC ............ *B60R 1/00* (2013.01); *B60R 11/04* (2013.01); *G06K 9/00791* (2013.01); *G06T 7/20* (2013.01); *G06T 7/50* (2017.01); *G06T 7/70* (2017.01); *H04N 5/2253* (2013.01); *H04N 5/23218* (2018.08); *H04N 5/23296* (2013.01); *H04N 5/247* (2013.01); *B60R 1/12* (2013.01); *B60R 2001/1253* (2013.01); *B60R 2011/004* (2013.01); *B60R 2300/802* (2013.01); *G06K 2209/23* (2013.01); *G06T 2207/30252* (2013.01)

(58) Field of Classification Search
CPC ..... B60R 1/00; B60R 2300/802; B60R 11/04; B60R 2001/1253; B60R 2011/004; B60R 1/12; B60R 2300/70; H04N 5/23218; H04N 5/2253; H04N 5/247; H04N 5/23296; H04N 5/2257; H04N 5/232; H04N 7/18; G06T 2207/30252; G06T 7/20; G06T 7/70; G06T 7/50; G06T 2207/20081; G06T 2207/20084; G06T 2207/30236; G06T 2207/30261; G06T 7/246; G06K 2209/23; G06K 9/00791
See application file for complete search history.

(56) References Cited

U.S. PATENT DOCUMENTS 10,086,764 B2 10/2018 Park
10,195,994 B2 2/2019 Abdel-Rahman et al.
(Continued)

*Primary Examiner* — Farzana Hossain
(74) *Attorney, Agent, or Firm* — Greenberg Traurig

(57) ABSTRACT

In one approach, a method includes: displaying, to a user of a first vehicle, image data obtained using a first field of view of a camera of the first vehicle, where the camera collects the image data for objects located outside of the first vehicle; detecting, by at least one processing device of the first vehicle, a second vehicle; determining, by the one processing device, whether the second vehicle is within a predetermined region relative to the first vehicle; and in response to determining that the second vehicle is within the predetermined region, displaying image data obtained using a second field of view of the camera.

12 Claims, 11 Drawing Sheets

(56) References Cited

U.S. PATENT DOCUMENTS

| | | | |
|---|---|---|---|
| 2003/0122930 A1* | 7/2003 | Schofield | H04N 7/181 |
| | | | 348/148 |
| 2005/0128061 A1* | 6/2005 | Yanai | H04N 7/181 |
| | | | 340/435 |
| 2014/0313335 A1* | 10/2014 | Koravadi | H04N 5/23216 |
| | | | 348/148 |
| 2016/0231748 A1* | 8/2016 | Ogale | G06K 9/00805 |
| 2017/0015248 A1* | 1/2017 | Baur | B60R 1/00 |
| 2017/0043720 A1* | 2/2017 | Shaw | G06K 9/00791 |
| 2018/0015879 A1 | 1/2018 | Kim | |
| 2019/0238658 A1* | 8/2019 | Shimizu | H04W 4/80 |

* cited by examiner

VIRTUAL MIRROR WITH AUTOMATIC ZOOM BASED ON VEHICLE SENSORS

FIELD OF THE TECHNOLOGY

At least some embodiments disclosed herein relate to collection of image data using a camera in general and more particularly, but not limited to collection by a vehicle of image data using a camera having a field of view that adjusts based on detection of a nearby vehicle.

BACKGROUND

Driver-controlled and autonomous vehicles can include many sensors to assist in controlling the vehicle. One type of sensor is a camera that provides image data. In some cases, a vehicle can navigate using information gathered about the environment based on the camera and other sensors of the vehicle. In other cases, a driver of the vehicle can use the gathered information in controlling operation of the vehicle. In addition to one or more cameras, a driver-controlled or autonomous vehicle can include sensors such as lidar and/or radar.

When a driver is controlling navigation of a vehicle, one of the challenges faced by the driver is determining the presence of other vehicles that are operating around the driver's vehicle. In many cases, a driver has difficulty seeing other vehicles due to various blind spots associated with the vehicle. For example, certain configurations of rear and side-view mirrors do not permit a driver to have full 360 degree visibility of other vehicles.

In general, the blind spot of the vehicle is an area around the vehicle that cannot be directly viewed by the driver when at the controls of the vehicle. Blind spots can exist in various vehicles such as aircraft, cars, motorboats, and trucks. In some cases, blind spots occur when side-view mirrors do not provide a driver with full visibility to the sides of the vehicle.

Currently, in order to assist the driver, many vehicles employ advanced driver-assistance systems. An advanced driver-assistance system (ADAS) is a system that provides feedback or automatically controls a vehicle in response to a defined input. One example of an ADAS is a blind spot detection system. Another example is a system that maintains a safe following distance of a vehicle with respect to other vehicles. Both systems suffer from significant technical problems.

Current blind spot ADASs are installed in non-autonomous vehicles and are mandatory in autonomous vehicles. These systems currently rely on sensor-based techniques such as detecting the presence of vehicles in a blind spot by using LiDAR, radar, or sonar to detect a vehicle within a certain distance of the driver's vehicle. While these systems may work in ideal conditions, they suffer significantly in poor weather conditions and, in general, are subject to environmental factors that could result in false positives and other negative detection conditions.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
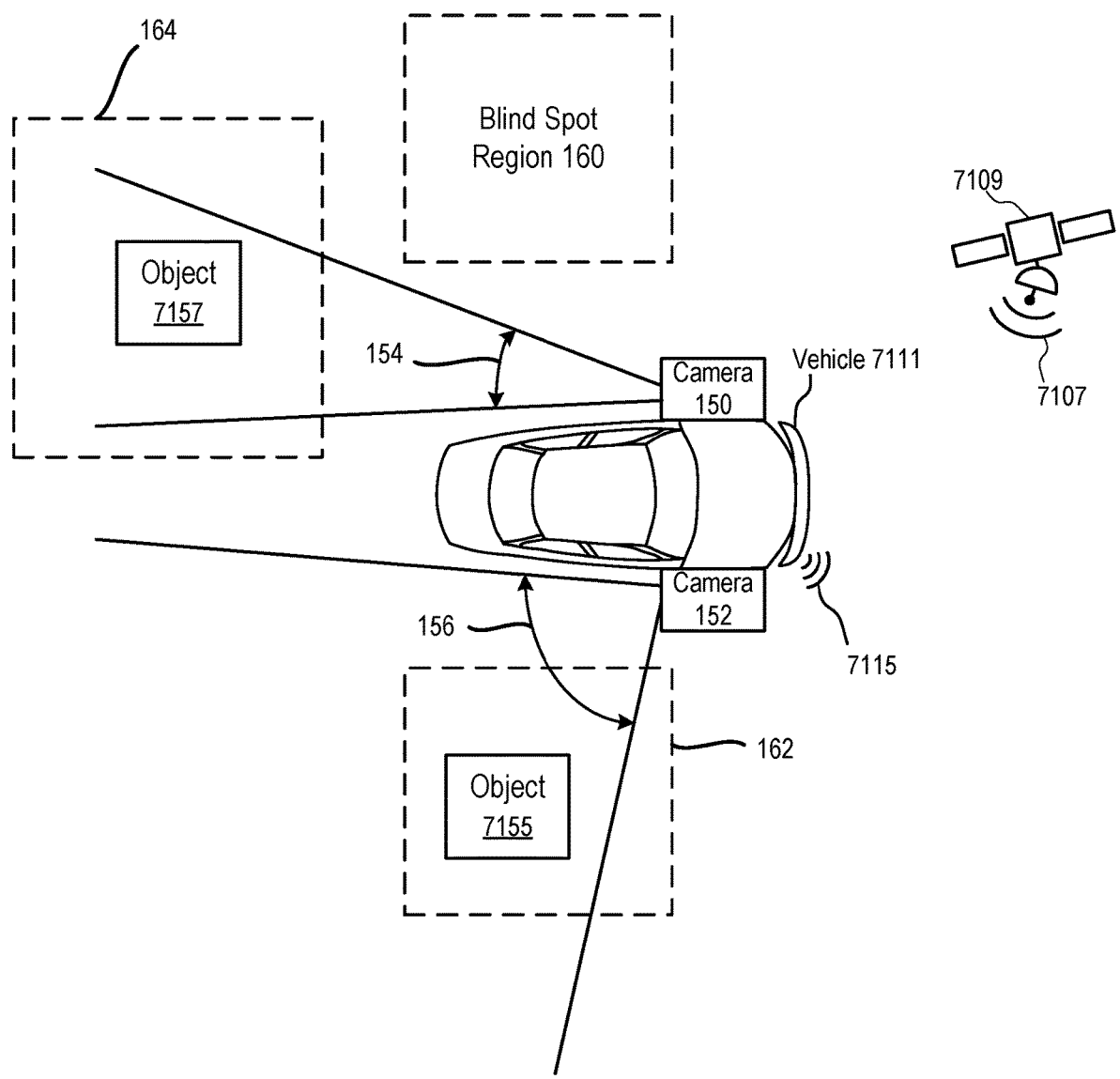
FIG. 1 shows cameras mounted on sides of a vehicle for providing rear and/or side views to a driver of the vehicle, according to one embodiment.

At least some embodiments herein relate to collection of data by one or more cameras using a field of view that is automatically adjusted when a nearby vehicle is detected. In some embodiments, use of the camera provides a "virtual" side-view mirror to provide a driver with views of objects on the sides of a vehicle that is being operated by the driver. In other embodiments, image data from the camera is used to provide improved navigation of a vehicle based on an improved extent of sensor coverage of regions around the vehicle due to automatic adjustment of a field of view for a camera or other sensor of the vehicle.

Various embodiments regarding a camera with an adjustable field of view as disclosed herein relate to systems and methods that can be used for a driver-controlled or an autonomous vehicle (e.g., to assist with and/or control navigation based on image data collected from one or more cameras of the vehicle). The vehicle can be, for example, any of several types of vehicle (e.g., a car, truck, aircraft, drone, watercraft, etc.). Implementations may include vehicles controlled by a human driver, autonomous vehicles, fixed structures including devices that perform image processing and/or object detection (e.g., security systems), and standalone camera sensor devices or systems.

Existing side-view mirrors on cars and other vehicles are typically mechanical structures in which a mirror is mounted to reflect light from physical objects so that a driver can see objects such as nearby vehicles in various regions around the vehicle. However, it is expected that such existing mirrors will be replaced in the future by virtual mirrors consisting of a camera mounted on the vehicle to provide a view outside of the vehicle. In one example, the mounted camera provides a live video feed for presentation to the driver on a display such as an LCD screen inside the vehicle.

Although such virtual mirrors can reduce wind noise due to a small camera footprint, and can accommodate intelligent safety features, such virtual mirrors still exhibit the technical problem of blind spots in which the driver is unable to see certain regions around the vehicle. Some virtual mirrors may provide a driver with an ability to adjust a field of view of the virtual mirror based on personal preferences. However, in many cases, the driver's field of view adjustment still does not remove all blind spots around the vehicle. The existence of these blind spots creates the technical problem of an increased probability of a collision with another vehicle that causes physical damage and/or injury.

Various embodiments of the present disclosure provide a technological solution to one or more of the above technical problems. In some embodiments, a method is provided to automatically change the field of view of a camera used as a virtual mirror based on detection of nearby vehicles. In one embodiment, a method comprises: displaying, to a user (e.g., a driver) of a first vehicle, image data obtained using a first field of view of a camera (e.g., as used in a virtual side-view mirror for the driver) of the first vehicle, wherein the camera collects the image data for objects located outside of the first vehicle; detecting, by at least one processing device of the first vehicle, a second vehicle; determining, by the one processing device, whether the second vehicle is within a predetermined region relative to the first vehicle; and in response to determining that the second vehicle is within the predetermined region, displaying image data obtained using a second field of view of the camera.

In one embodiment, the field of view of the camera is automatically changed by zooming a lens of the camera in and out based on detection of a nearby vehicle. This automatic zooming increases safety of vehicle operation by providing the driver a wider field of view that covers blind spots (e.g., dead angles in which the driver's view is blocked) when there is a nearby vehicle or another vehicle is about to overtake the driver's vehicle.

The automatic zooming further increases safety by providing the driver with a narrower field of view by zooming in when no nearby vehicle is detected on the side of the driver's vehicle on which the camera is mounted. By zooming in, the driver is provided with a longer-range view. One advantage is that the driver can have additional reaction time to respond to nearby vehicles.

In one embodiment, the maximum field of view of the camera when fully zoomed out is sufficiently large to provide viewing coverage of the entire side of the vehicle as well as viewing coverage towards the rear of the vehicle. In one example, the maximum field of view is at least 110 degrees. When the field of view of the camera is zoomed in, the driver is provided with increased detail for nearby objects such as vehicles. In one example, the field of view when narrowed is no greater than, for example, 60 degrees.

In some embodiments, the field of view used for the camera of the virtual mirror is adjusted based, at least in part, on a speed of the vehicle. In one embodiment, when the speed of the driver's vehicle is determined to be less than a predetermined speed, the field of view is adjusted to be wide by zooming out. In one example, the vehicle speed is less than 50 km/h. In one example, this wide field of view is used to provide a live video display to the driver that covers the side of the vehicle, including removing any blind spots on the side, and also covers viewing towards the rear of the vehicle.

In one embodiment, when the speed of the driver's vehicle is determined to be greater than a predetermined speed, the camera is configured to have a narrow field of view (e.g., by zooming in the lens of the camera). In one example, the speed of the vehicle is determined to be greater than 50 km/h. Using this narrow field of view, the primary focus of the camera is on a region more distant and towards the rear of the vehicle, and only to include a portion of the side region of the vehicle. In one example, this narrow field of view is comparable to the field of view typically provided by existing mechanical side-view mirrors.

In one embodiment, in response to determining that the speed of the vehicle is greater than a predetermined speed, a system further requires that no nearby vehicle is present on the side of the vehicle where the camera is mounted. If it is determined that a nearby vehicle is present on the side of the vehicle, then the camera will remain in a wide field of view even though the speed of the vehicle is greater than the predetermined speed.

In one embodiment, a computer system detects the presence of a nearby vehicle behind the driver's vehicle. The system also determines that the nearby vehicle is soon to overtake the driver's vehicle. In one example, the system determines that the nearby vehicle will be to the side of the driver's vehicle in less than a predetermined time. In one example, the predetermined time is a time between 5-30 seconds.

In response to determining both the presence of the nearby vehicle behind the driver's vehicle and that the nearby vehicle will be overtaking the driver's vehicle, the system causes the camera to change to a wide field of view. This permits the driver to view the side of the vehicle and to eliminate blind spots so that the nearby vehicle can be visually followed by the driver as it passes.

In one embodiment, the system determines that the nearby vehicle will be overtaking the driver's vehicle based upon detecting the nearby vehicle is within a predetermined distance behind the driver's vehicle. In one example, the predetermined distance is 30 meters or less. In one embodiment, the system determines that the nearby vehicle will be overtaking the driver's vehicle further based upon determining that the nearby vehicle has a speed greater than the speed of the driver's vehicle.

In one embodiment, the computer system detects a nearby vehicle on a side of the driver's vehicle where a camera is mounted. In one example, the nearby vehicle is detected on the side even though no prior detection of the nearby vehicle towards the rear of the driver's vehicle was performed. In response to detecting the nearby vehicle on the side, the camera is changed from a narrow field of view to a wide field of view.

In one embodiment, after the nearby vehicle passes the driver's vehicle, the field of view of the camera is switched from a wider field of view back to a narrower field of view. In one example, the new narrower field of view has a different angle than the original narrow field of view of the camera. In one example, the new narrower field of view is determined based on a situational context of the driver's vehicle. In one example, a neural network or other computer model is used to determine the new narrower field of view.

In one embodiment, after the nearby vehicle passes the driver's vehicle, prior to switching the camera back to a narrower field of view, the computer system further checks to determine that no other nearby vehicle is detected behind the car and/or to the side of the vehicle where the camera is mounted. If no such vehicle is detected, the camera switches to the narrower field of view. In one example, the nearby vehicle is determined to have passed the driver's vehicle when the nearby vehicle has passed the front footprint of the driver's vehicle.

In one embodiment, the nearby vehicle can be detected using one or more sensors. In one example, the sensor is a radar sensor, ultrasonic sensor, and/or image sensor. In one embodiment, an artificial intelligence model is used to analyze data from these sensors. In one example, an object detection algorithm is applied to data from these sensors.

In one embodiment, the nearby vehicle can be detected based on one or more communications received by the driver's vehicle from the nearby vehicle. In one example, the communications are V2X signals received from surrounding vehicles. In one example, the communications contain information regarding a position of the nearby vehicle. In one example, the driver's vehicle compares the position of the nearby vehicle to the position of the driver's vehicle. In one example, the nearby vehicle is detected based on the position of the nearby vehicle being less than a predetermined distance from the position of the driver's vehicle.

In one embodiment, the potential set of nearby vehicles to be detected can be limited. In one example, the set of nearby vehicles is limited to those vehicles that are determined to be moving in a same traffic direction as the driver's vehicle. In one example, the same traffic direction is determined based on direction of the nearby vehicle being within a predetermined number of degrees relative to the direction of the driver's vehicle. In one example, the direction of travel of the nearby vehicle is within 45 degrees of the direction of travel of the driver's vehicle.

In another example, the set of nearby vehicles is limited to those vehicles that are within a predetermined distance from the driver's vehicle. In one example, the nearby vehicle is within a predetermined distance of the rear of the driver's vehicle. In one example, the nearby vehicle is within a predetermined distance of the position of a camera being used to detect the nearby vehicle and/or used to present an image of the nearby vehicle to the driver.

In another example, the set of nearby vehicles is limited to those vehicles that are within a predetermined angle of view relative to a position on the driver's vehicle. In one example, the predetermined angle of view is the currently-used field of view of the camera (e.g., when being used to detect the nearby vehicle).

In one embodiment, detection of nearby vehicles by a driver's vehicle is performed using multiple sensors. One of these sensors can be a camera that provides image data for an image frame of a sensor used in the camera. When more than one sensor is used, a sensor fusion system can perform processing on data inputs from the various sensors.

In some cases, artificial intelligence (AI)-based sensor fusion is used. AI sensor fusion consists of a sensor (e.g., image, radar, lidar sensor) and a sensor fusion block (e.g., a circuit, or a processing device executing an image processing algorithm) that detects objects (e.g., a nearby vehicle) expected to be on the image. The sensor fusion algorithm(s) can be implemented on a dedicated processing device (e.g., SOC, FPGA, CPU, GPU, etc.).

In one embodiment, the sensor is a camera. A scanning window is incremented in an image frame for the data collected by the sensor. In other embodiments, other types of sensors can be used (e.g., a lidar or radar sensor). In one embodiment, scanning of an image frame of the sensor is performed using a scanning window with known existing image processing algorithms to detect objects within the scanning window.

FIG. 1 shows cameras 150, 152 mounted on sides of a vehicle 7111 for providing rear and/or side views to a driver of the vehicle 7111, according to one embodiment. Camera 150 has a narrower field of view with an angle 154. Camera 152 has a wider field of view with an angle 156. Camera 150 can be used to display images of nearby objects around the vehicle 7111 to the driver (e.g., using an LCD screen, a heads-up display projected on the windshield, and/or other type of display device). In one example, camera 150 provides a live video stream displayed to the driver that includes object 7157. In one example, object 7157 has been detected within a predetermined region 164. In one example, predetermined region 164 is defined at least in part based on a predetermined distance (e.g., a range of distance between 20-60 meters) located behind vehicle 7111.

Blind spot region 160 is a region that is a blind spot to the driver. In one example, object 7157 is a nearby vehicle that has been detected by vehicle 7111. In response to determining that the nearby vehicle is overtaking vehicle 7111, the field of view of camera 150 is changed to have a wider angle so that the driver is able to view the area around the side of the vehicle 7111, which includes blind spot region 160. This permits the driver to observe object 7157 as it passes vehicle 7111. Once object 7157 passes the front of vehicle 7111, the field of view of camera 150 is returned to angle 154.

In one example, a computer system of vehicle 7111 has detected object 7155 on a side of vehicle 7111 in a predetermined side region 162. In response to this detection, camera 152 is switched by the computer system to have a wider field of view with angle 156.

In one embodiment, vehicle 7111 has a wireless connection 7115 that is used to communicate with other vehicles. In one example, the wireless connection 7115 includes a transceiver that sends and receives signals (e.g., to or from other vehicles around the vehicle 7111). Vehicle 7111 can use these signals to determine that another vehicle is nearby.

In one embodiment, event data is extracted from non-volatile memory of vehicle 7111 and communicated through a wireless communication network to a central server. The central server analyzes the event data (e.g., to do further processing on image data to support an object detection by vehicle 7111). In one example, the server selects the type of event data (e.g. sensor data or control system status) to be downloaded for analysis. One example of the wireless communication network is a cell phone network.

In response to determining or identifying a detection of an object (e.g., by the server and/or vehicle 7111), at least one action is performed. For example, the server can transmit a communication to vehicle 7111 that causes the vehicle to re-configure software (e.g., to change configuration settings for a neural network that performs image analysis, or re-configure software that controls field of view for cameras 150, 152).

In one embodiment, vehicle 7111 can receive a signal from the central server that is used by vehicle 7111 to identify another vehicle as being nearby. The signal can cause vehicle 7111 to switch a field of view of camera 150 and/or 152 (e.g., in preparation for the other vehicle passing by vehicle 7111).

In one example, a vehicle may communicate, via a wireless connection 7115 with the central server to submit event data (e.g., positions and/or identities/types of nearby vehicles). The wireless connection 7115 may use a wireless local area network, a cellular communications network, and/or a communication link 7107 to a satellite 7109.

Figure 2:
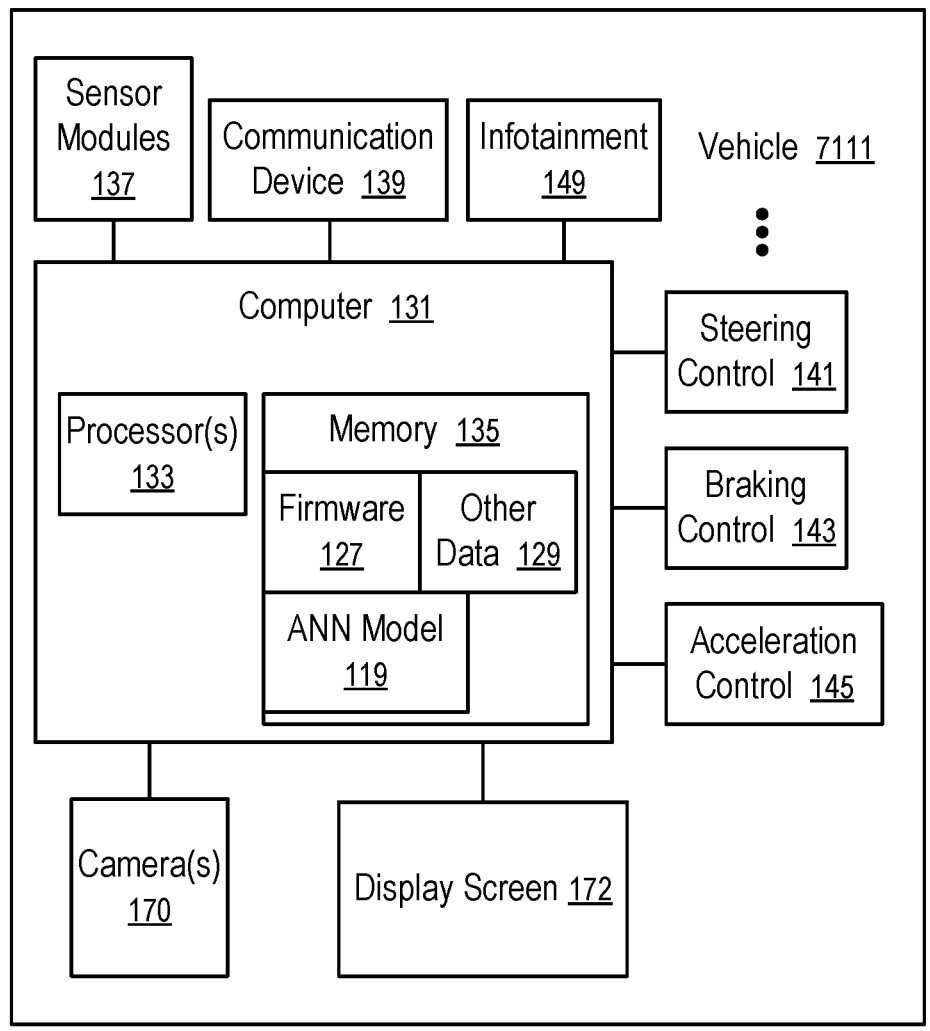
FIG. 2 shows an example of a vehicle that displays image data from one or more cameras, according to one embodiment.

FIG. 2 shows an example of vehicle 7111 that displays image data from one or more cameras 170, according to one embodiment. In one example, the cameras 170 are cameras 150, 152 of FIG. 1. Image data from the cameras 170 is presented on display screen 172 to the driver of vehicle 7111. In one example, the image data is a live video stream (e.g., to show nearby vehicles around vehicle 7111). In one example, the image data is augmented reality data superimposed on a live video stream. The augmented reality data is derived from analysis of raw image data obtained from cameras 170. In one example, the raw image data is analyzed using a an Artificial Neural Network (ANN) model 119.

In one embodiment, vehicle 7111 includes sensor modules 137 and is configured using ANN model 119. Sensor modules 137 provide object data to computer 131. Computer 131 includes a processor and/or a software process that performs the role of a central processing device.

In one example, the object data is collected data corresponding to an image captured by one of cameras 170. In one example, the collected data may be processed by a sensor module to make an initial vehicle or other object detection decision that is to be confirmed or refuted by computer 131. In one example, the other object is a person or animal.

The vehicle 7111 includes an infotainment system 149, a communication device 139, and one or more sensor modules 137. Computer 131 is connected to some controls of the vehicle 7111, such as a steering control 141 for the direction of the vehicle 7111, a braking control 143 for stopping of the vehicle 7111, an acceleration control 145 for the speed of the vehicle 7111, etc. In one example, communication device 139 is used to communicate with other vehicles (e.g., nearby vehicles that send signals including vehicle position).

The computer 131 of the vehicle 7111 includes one or more processors 133, memory 135 storing firmware (or software) 127, the ANN model 119, and other data 129.

In one example, firmware 127 is updated by an over-the-air update in response to a communication from a central server sent in response to an object detection (e.g., an initial object detection decision received from vehicle 7111 and confirmed by the central server after processing of the initial object detection made by vehicle 7111). Alternatively, and/or additionally, other firmware of various computing devices or systems of vehicle 7111 can be updated.

The one or more sensor modules 137 may include a visible light camera, an infrared camera, a lidar, radar, or sonar system, and/or peripheral sensors, which are configured to provide sensor input to the computer 131. A module of the firmware (or software) 127 executed in the processor(s) 133 applies the sensor input to an ANN defined by the model 119 to generate an output that identifies or classifies an object captured in the sensor input, such as an image or video clip. Data from this identification and/or classification can be included in data collected by a memory device (e.g., a non-volatile memory device) and sent from vehicle 7111 to the central server above.

Alternatively, and/or additionally, an object detection (e.g., by the server and/or vehicle) can be used by an autonomous driving module of the firmware (or software) 127 to generate a response. The response may be a command to activate and/or adjust a field of view of one or more of cameras 170 and/or one of the vehicle controls 141, 143, and 145. In one embodiment, the response is an action performed by the vehicle where the action has been configured based on an update command from the central server (e.g., the update command can be generated by the central server in response to an object detection based on analysis of event data from a vehicle). In one embodiment, prior to generating the control response, the vehicle is configured. In one embodiment, the configuration of the vehicle is performed by updating firmware of vehicle 7111. In one embodiment, the configuration of the vehicle includes updating of the computer model stored in vehicle 7111 (e.g., ANN model 119).

In one embodiment, the central server stores received sensor input as part of sensor data for the subsequent further training or updating of the ANN model 119 using a supervised training module. When an updated version of the ANN model 119 is available in the central server, the vehicle 7111 may use the communication device 139 to download the updated ANN model 119 for installation in the memory 135 and/or for the replacement of the previously installed ANN model 119. These actions may be performed in response to determining that vehicle 7111 is failing to detect some nearby passing vehicles or other objects.

In one example, the outputs of the ANN model 119 can be used to control (e.g., 141, 143, 145) the acceleration of a vehicle (e.g., 7111), the speed of the vehicle 111, and/or the direction of the vehicle 7111, during autonomous driving. In one example, the outputs of the ANN model 119 are used to control the field of view of one or more of cameras 170.

In one example, data obtained from a sensor of a vehicle (e.g., data used to detect a nearby vehicle) may be an image that captures an object using a camera that images using lights visible to human eyes, or a camera that images using infrared lights, or a sonar, radar, or lidar system. In one embodiment, image data obtained from at least one sensor of the vehicle is part of the collected data from the vehicle that is analyzed. In some instances, the ANN model is configured for a particular vehicle based on the sensor and other collected data.

Figure 3:
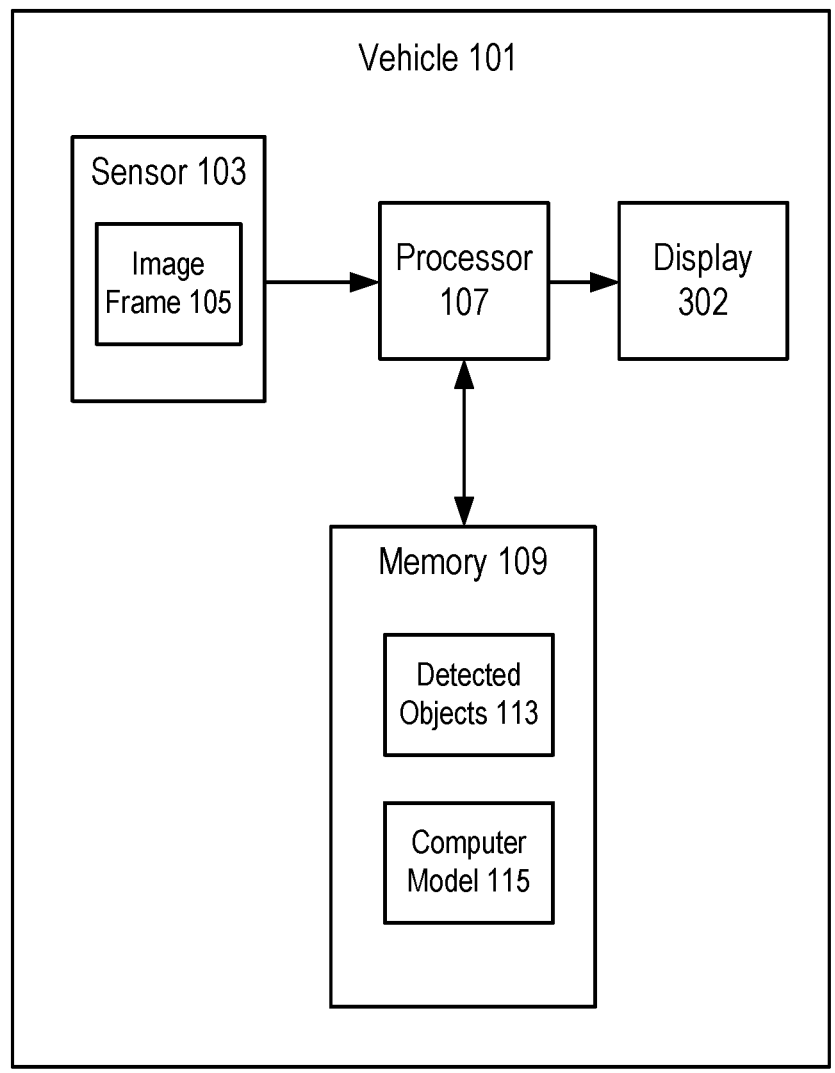
FIG. 3 shows an example computing system of a vehicle for processing data from a sensor and providing a display to a driver, according to one embodiment.

FIG. 3 shows an example computing system of a vehicle 101 for processing data from a sensor 103 and providing images on a display 302 to a driver, according to one embodiment. The computing system of vehicle 101 processes data from sensor 103. In one embodiment, collected data is obtained from image frame 105. Data collected from sensor 103 is used, for example, to navigate vehicle 101 and/or to control a field of view for one or more cameras (e.g., cameras 150, 152) of the vehicle.

Data collected by sensor 103 within image frame 105 is provided to the processor 107. When a new image within image frame 105 is collected by sensor 103, processor 107 executes an algorithm for object detection in the new image.

Processor 107 scans collected data to detect one or more objects. As each object is detected, data corresponding to the detected object is stored in a database of detected objects 113 in memory 109. The image processing algorithm used to scan the new image can be stored as computer model 115 in memory 109. In one example, computer model 115 includes a neural network and/or other machine learning algorithm.

In one embodiment, object detection includes training a computer model using at least one of supervised or unsupervised learning, and analyzing video data using the computer model. In one example, the computer model includes a neural network. In one example, the computer model is computer model 115. In one example, the video data is collected by sensor 103.

In one embodiment, object detection using a scanning window within image frame 105 may include using machine learning technology (e.g., a computer model such as a trained neural network) to detect an object that is identified in video data collected by a camera.

In one embodiment, the object detection may further include inputting video features extracted from video data into a computer model. For example, the video data used for training the computer model may be collected prior to analyzing the video data above. In one example, the computer model may be one or more artificial neural networks. For example, the neural networks may be trained based on video data collected by a sensor device.

In one embodiment, the object detection may further include determining an output from the computer model based on the extracted video data features. For example, the output from the computer model may be based on an output that is adjusted using a context determined from the collected video data.

In one embodiment, processor 107 may include functionality for the local processing of information, without the need of a server or backend computing device. In some embodiments, the processor 107 includes an audio analysis module, a video analysis module, and configuration settings, among other special purpose software units. Each of these modules may be stored as instructions and/or data on a memory device, such as the memory 109 (e.g., EEPROMs, and/or other non-volatile memory). The specific configuration and software used to instantiate these modules may be modifiable and updateable (e.g., may be updated from a remote computing device over a network).

The configuration setting(s) may also represent a particular configuration, parameters, weightings, or other settings of a quantitative model, classifier, machine learning algorithm, or the like. As one example, a support vector machine (SVM) may be represented as a hyperplane that divides two regions of vector space into two respective classifications. The coefficients defining the hyperplane may be included within the configuration setting(s). As another example, an artificial neural network (ANN) may comprise a set of interconnected nodes, with specific weights between each node connection. These connection weights may also be included within the configuration setting(s).

The processor 107 may carry out methods for detecting a particular audio event or a particular object within a video frame (e.g., a video frame within image frame 105). In some implementations, the processor 107 and/or other computing device includes a classifier or machine learning algorithm that is executed locally on vehicle 101. The parameters or weightings of the classifier or machine learning algorithm—that is, the configuration setting(s)—may be updated (e.g., received from a computing device via a communication module). Thus, the configuration setting(s) may include parameters, coefficients, or weightings that enable or improve the audio analysis module and the video analysis module to carry out particular tasks.

In some cases, various embodiments of a computing system including the processor 107 and/or the memory 109 may include thereon instructions that, upon execution, implement computer vision and/or image or video analysis functions. Alternatively, or additionally, a computing device (e.g., a device that includes processor 107) can include one or more integrated circuits in communication with processor(s) to carry out aspects of computer vision functions, such as object recognition, image or video compression, and/or face detection, among other functions.

As described herein, computer vision includes, for example, methods for acquiring, processing, analyzing, and understanding images and, in general, high-dimensional data from the real world in order to produce numerical or symbolic information, e.g., in the form of decisions. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific object, identification of landscape or structures, and/or identification of a specific vehicle type. Detection—The image data are scanned for a specific condition. Examples include detection of a vehicle in an automatic road toll system. Detection based on relatively simple and fast computations is sometimes used for finding smaller regions of interesting image data that can be further analyzed by more computationally demanding techniques to produce a correct interpretation.

Typical functions and components (e.g., hardware) found in many computer vision systems are described in the following paragraphs. The present embodiments may include at least some of these aspects. For example, embodiments of the vehicle 101 may include a computer vision module. The computer vision module may include any of the components (e.g., hardware) and/or functionality described herein with respect to computer vision, including, without limitation, one or more cameras, sensors, and/or processors. In some of the present embodiments, a microphone, a camera, and/or an imaging processor may be components of the computer vision module.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; estimation of application-specific parameters, such as object pose or object size; image recognition—classifying a detected object into different categories; image registration—comparing and combining two different views of the same object.

Decision making—Making the final decision required for the application, for example match/no-match in recognition applications.

In one example, the decision is that an object has been detected. In such case, the position of a scanning window in an image frame (e.g., image frame 105) is stored in memory.

One or more of the present embodiments may include a vision processing unit (which may be a component of a computer vision module). In one example, a vision processing unit is a class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a many-core DSP (digital signal processor). But, like video processing units, vision processing units may have a focus on low precision fixed point arithmetic for image processing.

In one embodiment, recognition algorithms can be divided into two main approaches: geometric, which looks at distinguishing features; or photometric, which is a statistical approach that distills an image into values and compares the values with templates to eliminate variances.

Some recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Additionally, or alternatively, a computing device (e.g., a device of vehicle 101) may also transmit captured audio/video to a computing device, such as a backend server, over a network for subsequent processing thereof. Such a backend server may, in some cases, conduct audio, image, and/or video analyses to determine the presence or absence of some object or event. If a detection is made, the backend server may then transmit messages to the computing device, a client device, and/or other devices. In some instances, transmitted audio/video may be stored in a storage device (e.g., in a database), to serve as training data for the purpose of generating and/or improving a classifier or machine learning tool.

A computing device (e.g., vehicle 101 of FIG. 1) may comprise components that facilitate the operation of a camera. For example, an imager may comprise a video recording sensor and/or a camera chip. In one aspect of the present disclosure, the imager may comprise a complementary metal-oxide semiconductor (CMOS) array, and may be capable of recording high definition (e.g., 720p, 2120p, etc.) video files.

A camera processor may comprise an encoding and compression chip. In some embodiments, the camera processor may comprise a bridge processor. The camera processor may process video recorded by the imager, and may transform this data into a form suitable for wireless transfer by a communication module to a network. The camera memory may comprise volatile memory that may be used when data is being buffered or encoded by the camera processor. For example, in certain embodiments the camera memory may comprise synchronous dynamic random access memory (SD RAM). Infrared LED(s) may comprise light-emitting diodes capable of radiating infrared light. Infrared filter(s) may comprise a system that, when triggered, configures the imager to see primarily infrared light as opposed to visible light. When the light sensor(s) detects a low level of ambient light (which may comprise a level that impedes the performance of the imager in the visible spectrum), the infrared LED(s) may shine infrared light out to the environment, and the infrared filter(s) may enable the imager to see this infrared light as it is reflected or refracted off of objects within a field of view of the sensor. This process may provide a computing device with a night vision function.

Various embodiments regarding using an image frame for scanning of image data may be implemented using a computing device (e.g., vehicle 101) that includes a processor(s) (e.g., processor 107), memory (e.g., memory 109), a display(s), a communication module(s), an input device(s), a speaker(s), a microphone(s), a connector(s), a battery, and a data port. These components are communicatively coupled together by an interconnect bus. The processor(s) may include any processor used in smartphones and/or portable computing devices, such as an ARM processor (a processor based on the RISC (reduced instruction set computer) architecture developed by Advanced RISC Machines (ARM)). In some embodiments, the processor(s) may include one or more other processors, such as one or more conventional microprocessors, and/or one or more supplementary co-processors, such as math co-processors.

The memory may include both operating memory, such as random access memory (RAM), as well as data storage, such as read-only memory (ROM), hard drives, flash memory, or any other suitable memory/storage element. The memory may include removable memory elements, such as a CompactFlash card, a MultiMediaCard (MMC), and/or a Secure Digital (SD) card. In some embodiments, the memory may comprise a combination of magnetic, optical, and/or semiconductor memory, and may include, for example, RAM, ROM, flash drive, and/or a hard disk or drive. The processor(s) and the memory each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor(s) may be connected to the memory via the data port.

The display(s) may include any user interface or presentation elements suitable for a smartphone and/or a portable computing device, such as a keypad, a display screen, a touchscreen, a microphone, and a speaker. The communication module(s) is configured to handle communication links between the computing device and other, external devices (e.g., server) or receivers, and to route incoming/outgoing data appropriately. For example, inbound data from the data port may be routed through the communication module(s) before being directed to the processor(s), and outbound data from the processor(s) may be routed through the communication module(s) before being directed to the data port. The communication module(s) may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The data port may be any type of connector used for physically interfacing with a smartphone and/or a portable computing device, such as a mini-USB or USB-C port or an IPHONE®/IPOD® 30-pin connector or LIGHTNING® connector. In other embodiments, the data port may include multiple communication channels for simultaneous communication with, for example, other processors, servers, and/or client terminals.

The memory may store instructions for communicating with other systems, such as a computer. The memory may store, for example, a program (e.g., computer program code) adapted to direct the processor(s) in accordance with the present embodiments. The instructions also may include program elements, such as an operating system. While execution of sequences of instructions in the program causes the processor(s) to perform the process steps described herein, hard-wired circuitry may be used in place of, or in combination with, software/firmware instructions for implementation of the processes of the present embodiments. Thus, the present embodiments are not limited to any specific combination of hardware and software.

The input device(s) may include any combination of hardware and/or software elements that receive user input and/or facilitate the interpretation of received input. The input device(s) may be hardware (e.g., physical buttons and switches), software (e.g., virtual buttons, sliders, etc.), or some combination thereof (e.g., software-controlled haptic feedback for simulating button clicks). In some instances, the input device(s) includes a touchscreen or touch-based digitizer. The input device(s) may include a virtual keyboard or other virtual input elements as well.

The speaker(s) may include any combination of speakers or other sound-emitting devices. The speaker(s) may be operable to produce a variety of sounds, such as audio from live video, notification or alert sounds, or other audible sounds.

The microphone(s) may include any combination of transducers that convert pressure waves into electrical signals. The microphone(s) may capture audio, which may, in some instances, be transmitted to a separate computing device or server. That transmitted audio may then be relayed to another computing device.

The antenna may enable the computing device to communicate wirelessly. For instance, the antenna permits the computing device to communicate over cellular networks, via one or more communication standards (e.g., GSM, CDMA, LTE, etc.). The antenna may allow the computing device to communicate over other wireless protocols, such as Wi-Fi or Bluetooth, among other wireless protocols. The antenna may include multiple antennae, depending on the particular implementation.

Figure 4:
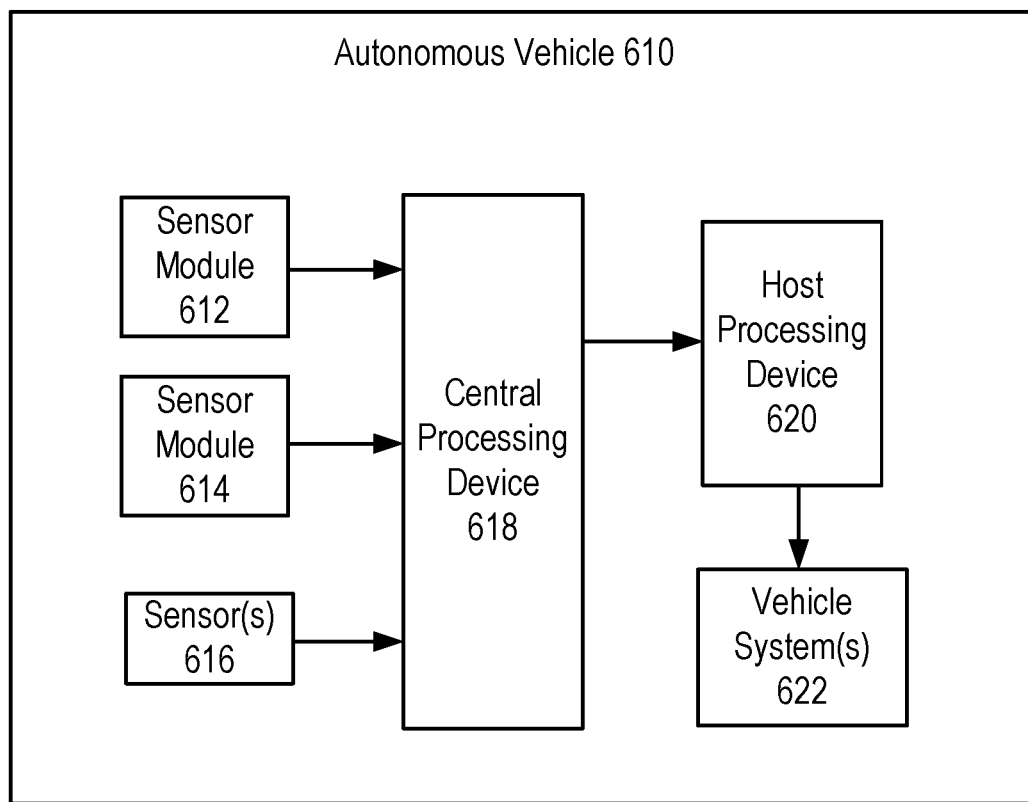
FIG. 4 shows an autonomous vehicle including sensor modules that provide data to a central processing device, according to one embodiment.

FIG. 4 shows an autonomous vehicle 610 including sensor modules 612, 614 that provide data to a central processing device 618, according to one embodiment. Central processing device 618 is an example of processor 107 of FIG. 3.

Each sensor module 612, 614 provides object data (e.g., data regarding nearby vehicles) to central processing device 618. One or more other sensors 616 provide sensor data to central processing device 618. In one embodiment, sensors 616 provide raw sensor data and/or object data.

Central processing device 618 compares the object data received from each of the sensor modules 612, 614. In one example, the comparison is based on detection of a single object in the field of view of sensor module 612 and sensor module 614. In one example, the comparison is based on a correlation determined based on several events, each event related to detection of a different object. Central processing device 618 uses the comparison of the object data to determine whether the object data from sensor module 612 corresponds to an object.

In response to detecting an object, central processing device 618 sends a signal to a host processing device 620. The signal indicates that an object has been identified.

In one embodiment, host processing device 620 performs one or more actions in response to receiving the signal indicating object detection. In various embodiments, host processing device 620 sends control signals to one or more vehicle systems 622 that change the operation of one or more aspects of the autonomous vehicle 610. In one example, a field of view of the camera acting as a virtual mirror is changed. In one example, navigation, braking control, and/or engine control are changed. In another example, a configuration for one or more vehicle systems 622 is updated. In one example, firmware for one of the vehicle systems 622 is updated. In one example, at least a portion of the firmware is downloaded from a central server using wireless communications.

In one embodiment, sensors 616 provide data to central processing device 618 that is used to determine a context of operation of autonomous vehicle 610. For example, sensor 616 may provide data indicating whether the vehicle is currently operating in daytime or nighttime. This provides contextual data that central processing device 618 can use in analyzing image data to detect an object. In one embodiment, the contextual data is used to select a field of view for cameras 150, 152.

In one example, central processing device 618 is a system-on-chip (SOC), field programmable gate array (FPGA), CPU, or graphics processing unit (GPU). In one example, central processing device 618 stores run-time data in a volatile memory device(s) (e.g., a DRAM device). In one example, central processing device 618 can include logic circuitry implementing at least a portion of various embodiments described herein.

In one example, host processing device 620 is a system-on-chip (SOC), field programmable gate array (FPGA), CPU, or graphics processing unit (GPU). In one example, host processing device 620 stores data in a volatile memory device(s). For example, the data stored is received from vehicle systems 622. The host processing device 620 can be, for example, a processing core of a processor, an execution unit, etc.

In one example, the central processing device 618 and/or host processing device 620 can include hardware such as one or more integrated circuits and/or discrete components, a buffer memory, a cache memory, or a combination thereof. The host or central processing device can be a microcontroller, special purpose logic circuitry (e.g., a field programmable gate array (FPGA), an application specific integrated circuit (ASIC), etc.), or another suitable processor.

In one example, each sensor module 612, 614 is a camera. Each camera shares common or partially overlapping fields of view. In one example, each camera is mounted on the same side of the vehicle. In one example, it is expected during normal operation that the cameras will detect the same object most of the time.

In an alternative embodiment, sensor modules 612, 614 are cameras that are used on a driver-controlled vehicle. In one example, the cameras act together to provide a virtual mirror for the driver.

Figure 5:
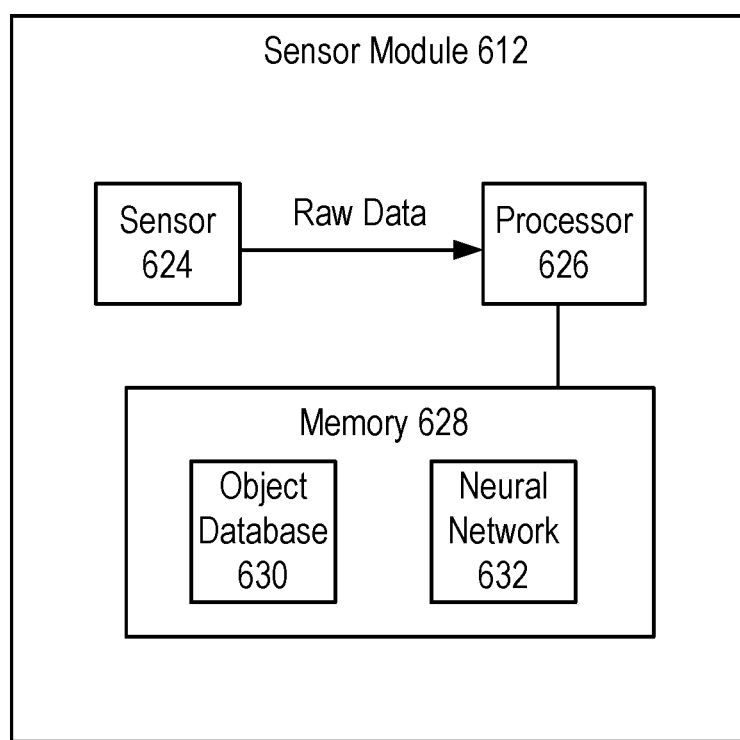
FIG. 5 shows a sensor module including a sensor that provides raw data to a processor, according to one embodiment.

FIG. 5 shows a sensor module 612 including a sensor 624 that provides raw data to a processor 626, according to one embodiment. Processor 626 is an example of processor 107 of FIG. 3.

In one example, sensor 624 is a camera. In another example, sensor 624 is a radar or lidar sensor. Processor 626 is, for example, a microprocessor, a GPU, and/or an FPGA.

Processor 626 executes one or more processes to evaluate the raw data from sensor 624 (e.g., to detect a nearby vehicle). Processor 626 provides object data as a result from this processing. The object data is transmitted to a central processing device. The object data includes, for example, position data and/or object type data. Other metadata characterizing the detected object may also be included.

Processor 626 accesses memory 628 during operation. Memory 628 is, for example, volatile memory and/or non-volatile memory.

Memory 628 includes an object database 630. Database 630 includes a library of object types. Processor 626 can retrieve a predetermined object type from the library when providing a result from evaluating raw data from sensor 624.

In one embodiment, the object type is displayed on display screen 172 of FIG. 2.

In one embodiment, neural network 632 is stored in memory 628. Neural network 632 can be used to provide one or more inputs to processor 626 when it is evaluating raw data from sensor 624. In one embodiment, neural network 632 receives inputs from sensors 616 that are used for determining a context of operation for autonomous vehicle 610 as an output from the neural network 632. The output is provided to processor 626 for use in evaluating raw data from sensor 624. A result of the evaluation can be displayed to the driver on display screen 172.

Figure 6:
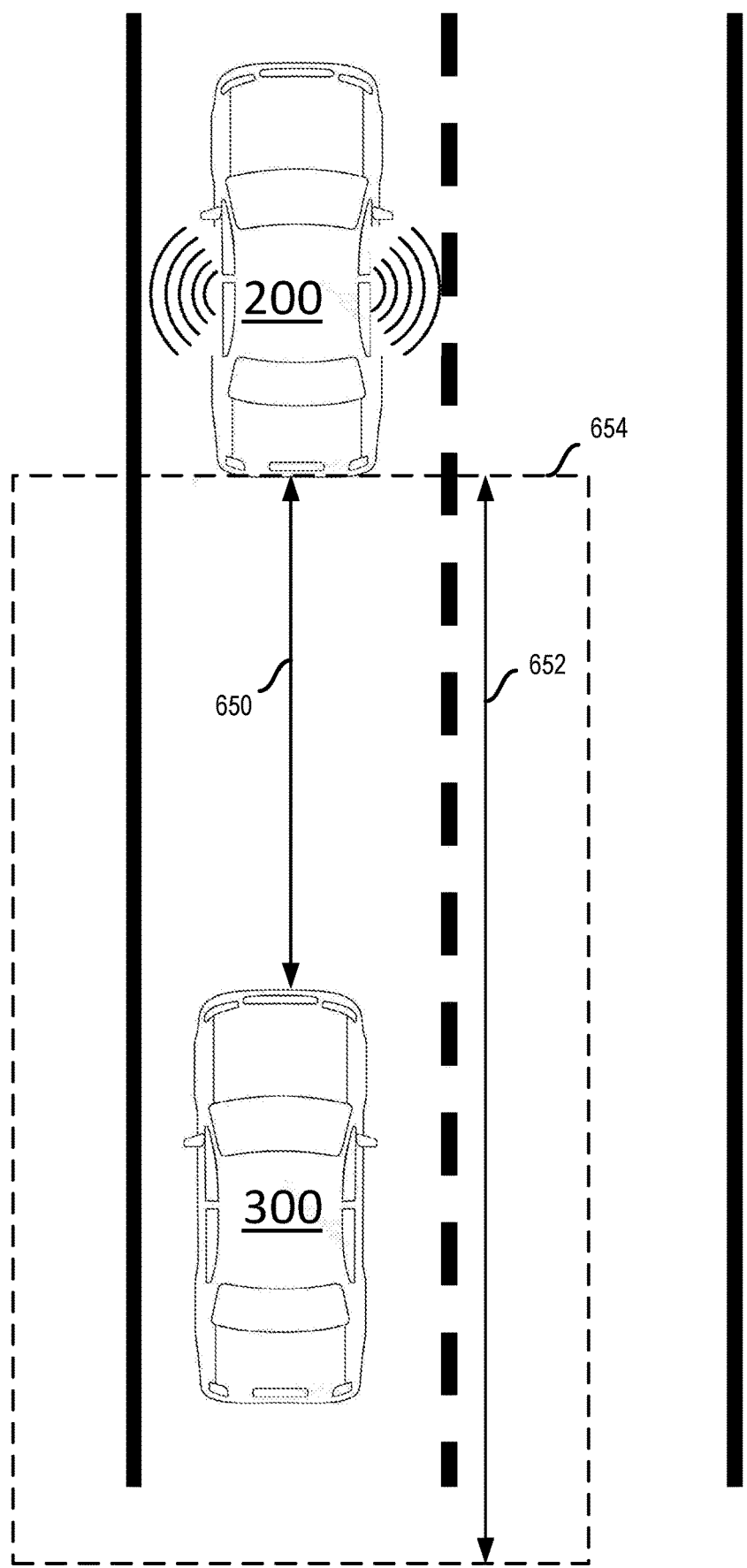
FIG. 6 shows an approaching vehicle overtaking a vehicle of a driver, according to one embodiment.

FIG. 6 shows an approaching vehicle 300 overtaking a vehicle 200 piloted by a driver, according to one embodiment. A computer system of vehicle 200 detects the presence of vehicle 300 within a predetermined region 654.

In one embodiment, vehicle 300 is detected based on determining that a distance 650 of vehicle 300 behind vehicle 200 is less then a predetermined distance 652. In response to detecting vehicle 300, one or more cameras of vehicle 200 are adjusted to change their field of view. In one example, the camera is mounted on the side of vehicle 200. In one example, the camera is mounted on the rear of vehicle 200.

Figure 7:
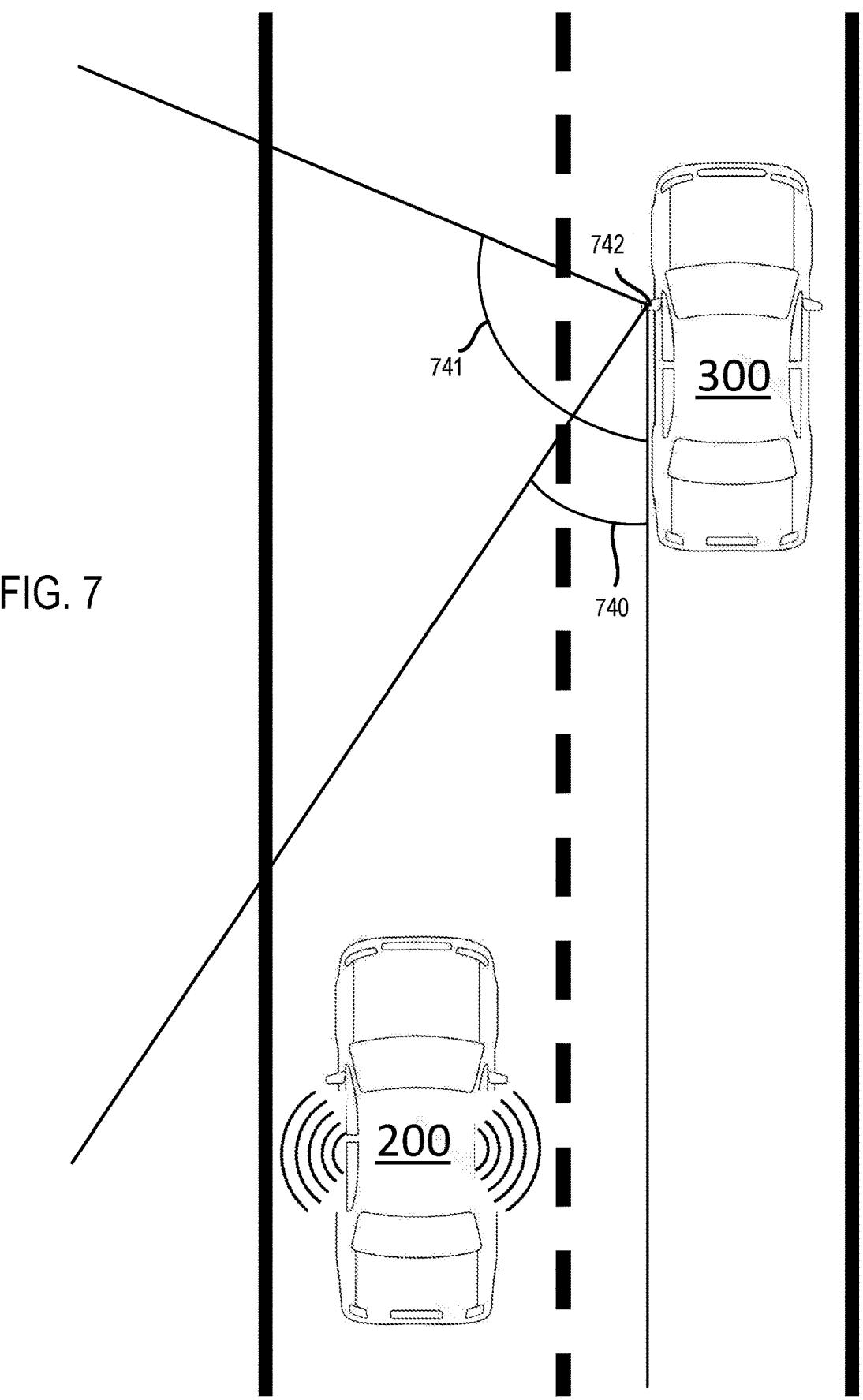
FIG. 7 shows an approaching vehicle in a different lane of a driver's vehicle and that is preparing to pass, according to one embodiment.

FIG. 7 shows an approaching vehicle 200 in a different lane of a driver's vehicle 300 and that is preparing to pass, according to one embodiment. Vehicle 300 detects the presence of vehicle 200, such as described above. In response to detecting vehicle 200, a field of view of camera 742 is adjusted from a narrow angle 740 to a wide angle 741.

Figure 8:
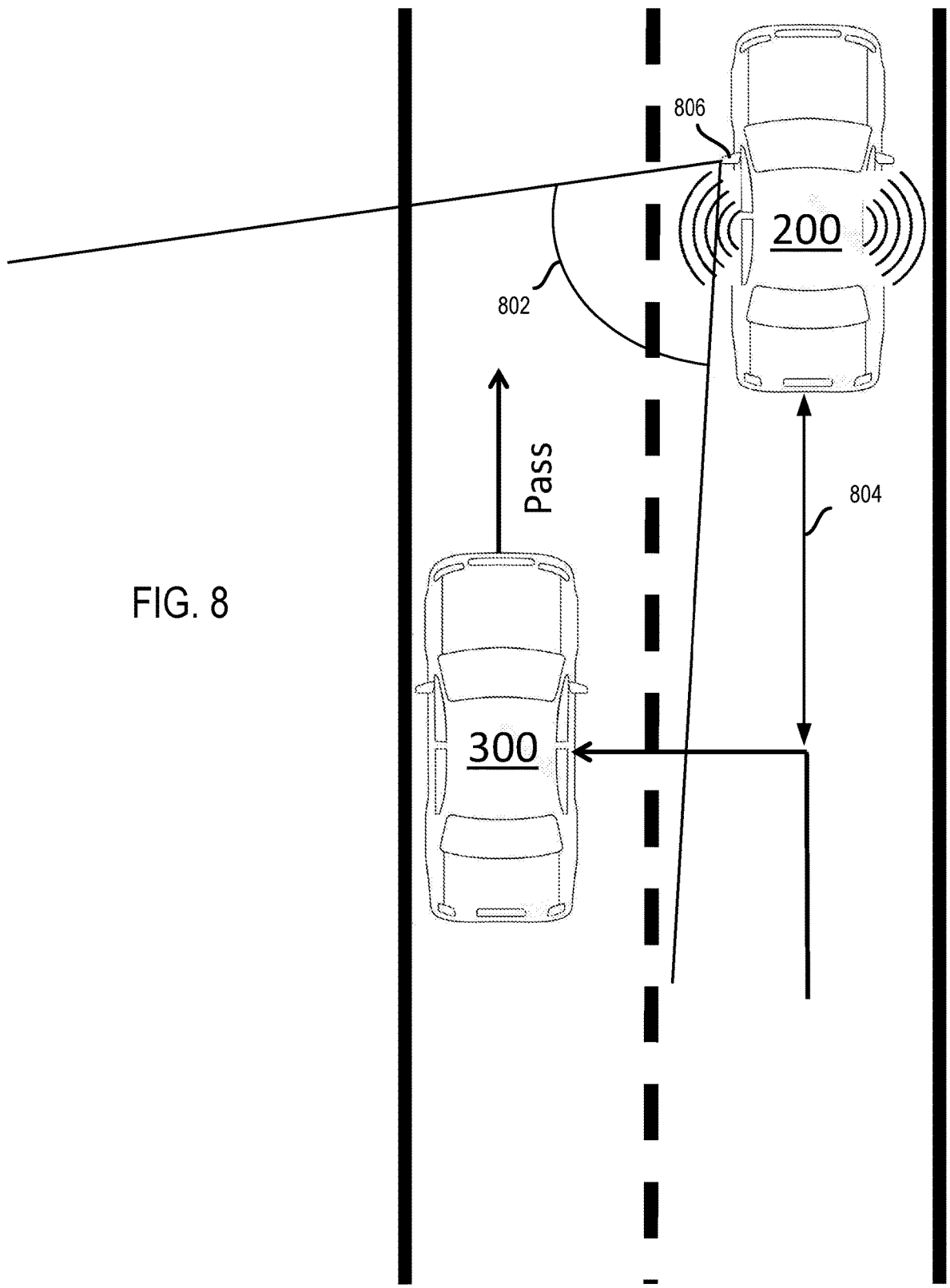
FIG. 8 shows a vehicle that approaches from the rear of a driver's vehicle and then changes lanes in preparation for passing, according to one embodiment.

FIG. 8 shows a vehicle 300 that approaches from the rear of a driver's vehicle 200 and then changes lanes in preparation for passing, according to one embodiment. Vehicle 300 is detected by vehicle 200 based on determining that a distance 804 of vehicle 300 behind vehicle 200 is less than a predetermined distance. Vehicle 200 also determines that the vehicle 300 is traveling at a speed greater than vehicle 200. In response to detecting the presence of vehicle 300 and determining the speed of vehicle 300, vehicle 200 adjusts a field of view of camera 806 to have an angle 802.

Figure 9:
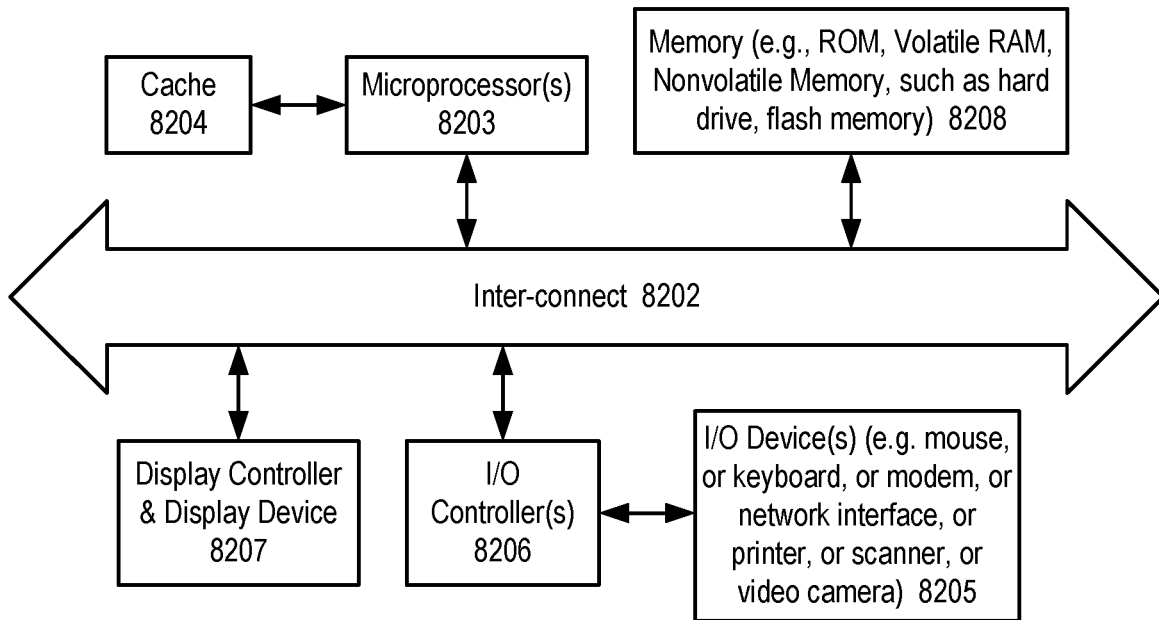
FIG. 9 shows a block diagram of a computing device (e.g., a server), which can be used in various embodiments.

In FIG. 9, a computing device 8201 includes an inter-connect 8202 (e.g., bus and system core logic), which interconnects a microprocessor(s) 8203 and memory 8208. The microprocessor 8203 is coupled to cache memory 8204 in the example of FIG. 9.

The inter-connect 8202 interconnects the microprocessor(s) 8203 and the memory 8208 together and also interconnects them to a display controller and display device 8207 and to peripheral devices such as input/output (I/O) devices 8205 through an input/output controller(s) 8206. Typical I/O devices include mice, keyboards, modems, network interfaces, printers, scanners, video cameras and other devices which are well known in the art.

The inter-connect 8202 may include one or more buses connected to one another through various bridges, controllers and/or adapters. In one embodiment the I/O controller 8206 includes a USB (Universal Serial Bus) adapter for controlling USB peripherals, and/or an IEEE-1394 bus adapter for controlling IEEE-1394 peripherals.

The memory 8208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a solid-state drive, magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the computing device. A non-volatile memory that is remote from the computing device, such as a network storage device coupled to the computing device through a network interface such as a modem or Ethernet interface, can also be used.

In one embodiment, a computing device as illustrated in FIG. 9 is used to implement a computing device including computer 131, processor 107, sensor module 612, central processing device 618, and/or host processing device 620.

In another embodiment, a computing device as illustrated in FIG. 9 is used to implement a user terminal or a mobile device on which an application is installed or being installed. A user terminal may be in the form, for example, of a laptop or notebook computer, or a personal desktop computer.

In some embodiments, one or more servers can be replaced with the service of a peer to peer network of a plurality of data processing systems, or a network of distributed computing systems. The peer to peer network, or a distributed computing system, can be collectively viewed as a computing device.

Embodiments of the disclosure can be implemented via the microprocessor(s) 8203 and/or the memory 8208. For example, the functionalities described can be partially implemented via hardware logic in the microprocessor(s) 8203 and partially using the instructions stored in the memory 8208. Some embodiments are implemented using the microprocessor(s) 8203 without additional instructions stored in the memory 8208. Some embodiments are implemented using the instructions stored in the memory 8208 for execution by one or more general purpose microprocessor(s) 8203. Thus, the disclosure is not limited to a specific configuration of hardware and/or software.

Figure 10:
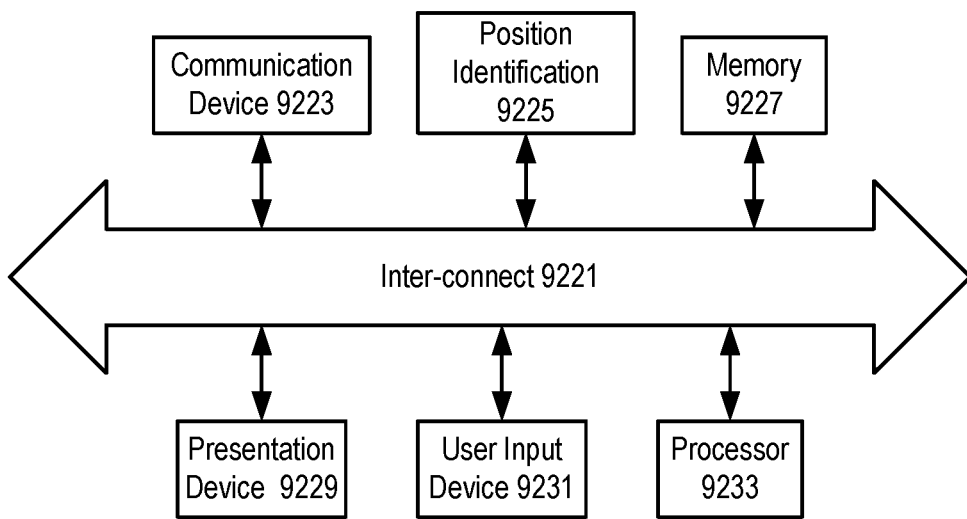
FIG. 10 shows a block diagram of a computing device (e.g., a mobile device of a user), according to one embodiment.

FIG. 10 shows a block diagram of a computing device (e.g., a mobile device of a user, or a user terminal), according to one embodiment. In one example, the computing device displays images based on image data collected by camera 150 or 152.

In FIG. 10, the computing device includes an interconnect 9221 connecting the presentation device 9229, user input device 9231, a processor 9233, a memory 9227, a position identification unit 9225 and a communication device 9223.

In FIG. 10, the position identification unit 9225 is used to identify a geographic location. The position identification unit 9225 may include a satellite positioning system receiver, such as a Global Positioning System (GPS) receiver, to automatically identify the current position of the computing device.

In FIG. 10, the communication device 9223 is configured to communicate with a server to provide data, including parameter data. In one embodiment, the user input device 9231 is configured to receive or generate user data or content. The user input device 9231 may include a text input device, a still image camera, a video camera, and/or a sound recorder, etc.

Figure 11:
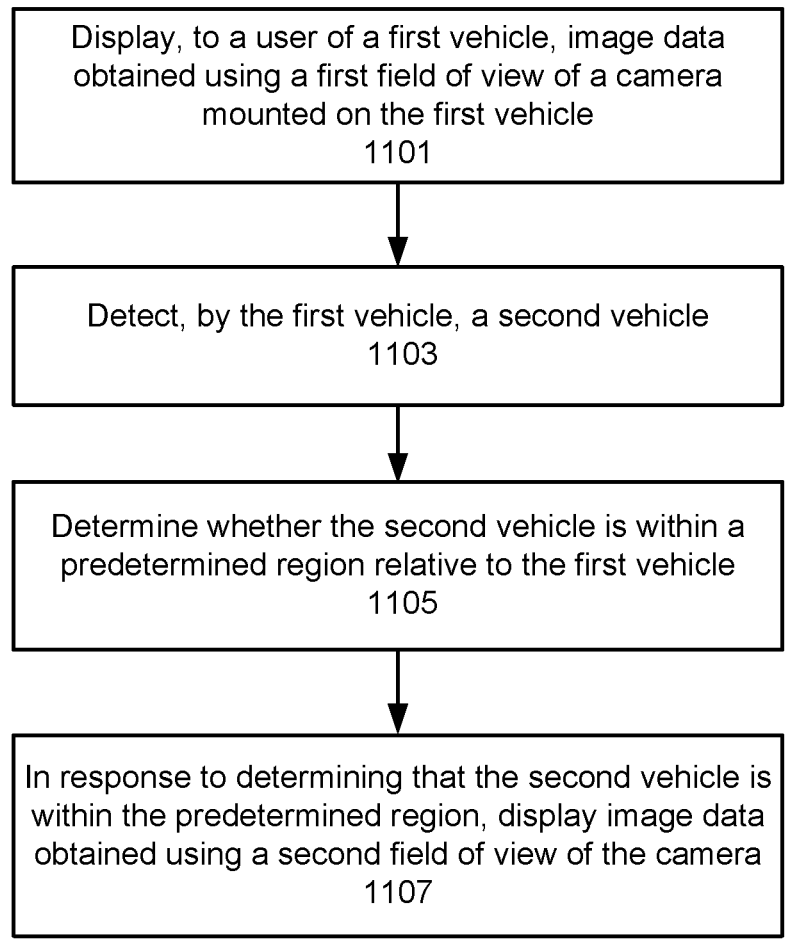
FIG. 11 shows a method for adjusting a field of view of a vehicle camera based on detection of a nearby vehicle, according to one embodiment.

FIG. 11 shows a method for adjusting a field of view of a vehicle camera based on detection of a nearby vehicle, according to one embodiment. For example, the method of FIG. 11 can be implemented in the system of FIGS. 1 and 2.

The method of FIG. 11 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method of FIG. 11 is performed at least in part by one or more processors. In some embodiments, the method is implemented by a system using the processors and memory of FIG. 9 or 10.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1101, image data obtained using a first field of view of a camera mounted on a first vehicle is displayed to a user of the first vehicle. In one example, image data is obtained using camera 150 with the field of view having angle 154. In one example, image data is obtained using camera 742 of FIG. 7. The camera 742 obtains the image data using a field of view having angle 740.

At block 1103, a second vehicle is detected by the first vehicle. In one example, the first vehicle is vehicle 7111 and the second vehicle is object 7157. In one example, the first vehicle is vehicle 300 of FIG. 7, and the second vehicle is vehicle 200 of FIG. 7.

At block 1105, a determination is made whether the second vehicle is within a predetermined region relative to the first vehicle. In one example, vehicle 7111 determines whether the object 7157 is within region 164. In one example, vehicle 7111 determines whether object 7155 is within region 162.

At block 1107, in response to determining that the second vehicle is within a predetermined region, image data obtained using a second field of view of the camera is displayed to the user. In one example, vehicle 300 of FIG. 7 obtains image data from camera 742 using a field of view having angle 741.

In one embodiment, a method comprises: displaying, to a user of a first vehicle (e.g., vehicle 300 of FIG. 7), image data obtained using a first field of view (e.g., angle 740) of a camera (e.g., camera 742) of the first vehicle, wherein the camera collects the image data for objects located outside of the first vehicle; detecting, by at least one processing device of the first vehicle, a second vehicle (e.g., vehicle 200 of FIG. 7); determining, by the one processing device, whether the second vehicle is within a predetermined region relative to the first vehicle; and in response to determining that the second vehicle is within the predetermined region, displaying image data obtained using a second field of view (e.g., angle 741) of the camera.

In one embodiment, the first field of view is narrower than the second field of view.

In one embodiment, the second field of view includes a first region on a side of the first vehicle, the first region including a region associated with a blind spot of the user when operating the vehicle.

In one embodiment, determining whether the second vehicle is within the predetermined region comprises determining whether the second vehicle is within a predetermined distance (e.g., distance 652 of FIG. 6) of the first vehicle.

In one embodiment, displaying the image data obtained using the second field of view is further responsive to determining that a speed of the second vehicle is greater than a speed of the first vehicle.

In one embodiment, the method further comprises: determining whether the first vehicle is traveling faster than a predetermined speed; wherein displaying the image data obtained using the first field of view is responsive to determining that the first vehicle is traveling faster than the predetermined speed.

In one embodiment, the camera is mounted on a side of the first vehicle, and the method further comprises: determining whether a vehicle is present on the side of the first vehicle; wherein displaying the image data obtained using the first field of view is responsive to determining that no vehicle is present on the side of the first vehicle.

In one embodiment, the camera is mounted on a side of the first vehicle, and the predetermined region is a region on the side of the first vehicle, or is a region behind the first vehicle and within a predetermined distance of the first vehicle.

In one embodiment, the method further comprises: determining that the second vehicle has passed the first vehicle; in response to determining that the second vehicle has passed the first vehicle, changing a configuration of the camera to collect image data using the first field of view.

In one embodiment, changing the configuration of the camera to collect image data using the first field of view is further responsive to determining that no vehicle is present in a side region of the first vehicle in which the second vehicle has passed the first vehicle.

In one embodiment, detecting the second vehicle comprises receiving, by the first vehicle, a communication from the second vehicle.

In one embodiment, displaying the image data obtained using the second field of view of the camera is further responsive to determining that the second vehicle is moving in a same direction as the first vehicle.

In one embodiment, determining whether the second vehicle is within the predetermined region comprises determining whether the second vehicle is within a predetermined angle of view relative to a position of the camera.

In one embodiment, wherein the position is a first position (e.g., a position of a camera), and wherein determining whether the second vehicle is within the predetermined region further comprises determining whether the second vehicle is within a predetermined distance of the first position, or within a predetermined distance of a second position (e.g., a position on the rear) of the first vehicle.

In one embodiment, a system comprises: a camera (e.g., camera 170) mounted on a side of a first vehicle and configured to collect image data regarding objects outside of the first vehicle; a display screen (e.g., display screen 172) positioned for viewing by a driver of the first vehicle; at least one processing device; and memory containing instructions configured to instruct the at least one processing device to: present, on the display screen, images based on data collected using a first field of view of the camera; detect a second vehicle; determine whether the second vehicle is within a predetermined region; and in response to determining that the second vehicle is within the predetermined region, present, on the display screen, images based on data collected using a second field of view of the camera.

In one embodiment, the first field of view is narrower than the second field of view.

In one embodiment, the second vehicle is determined to be within the predetermined region when the second vehicle is within a predetermined distance of the first vehicle.

In one embodiment, detecting the second vehicle comprises receiving a communication from the second vehicle, the communication including a position of the second vehicle; and determining whether the second vehicle is within the predetermined region comprises determining whether the position of the second vehicle is within a predetermined distance of a position of the first vehicle.

In one embodiment, presenting the images based on the data collected using the first field of view is responsive to determining that the first vehicle is traveling faster than a predetermined speed, and further responsive to determining that no vehicle is present on a side of the first vehicle.

In one embodiment, a non-transitory computer storage medium stores instructions which, when executed on at least one processing device, cause the at least one processing device to at least: display, to a user of a first vehicle, image data obtained using a first field of view of a camera of the first vehicle; detect a second vehicle; determine whether the second vehicle is within a predetermined region relative to the first vehicle; and in response to determining that the second vehicle is within the predetermined region, display image data obtained using a second field of view of the camera.

Figure 12:
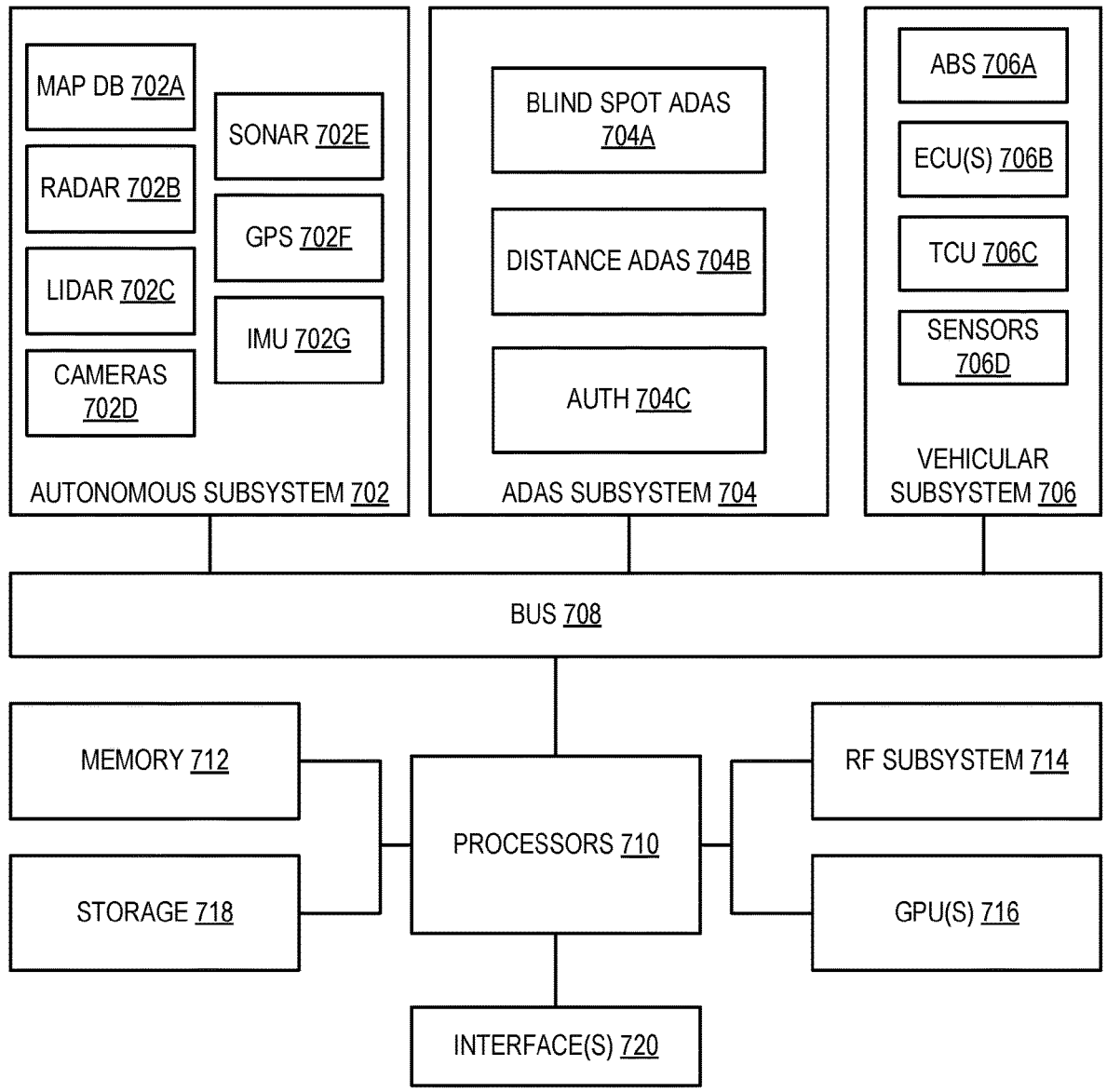
FIG. 12 is a block diagram of a vehicle according to some embodiments.

FIG. 12 is a block diagram of a vehicle according to some embodiments. The system illustrated in FIG. 12 may be installed entirely within a vehicle.

The system optionally includes an autonomous vehicle subsystem (702). In the illustrated embodiment, autonomous vehicle subsystem (702) includes map database (702A), radar devices (702B), Lidar devices (702C), digital cameras (702D), sonar devices (702E), GPS receivers (702F), and inertial measurement units (702G). In one embodiment, map database (702A) stores a plurality of high-definition three-dimensional maps used for routing and navigation. Radar devices (702B), Lidar devices (702C), digital cameras (702D), sonar devices (702E), GPS receivers (702F), and inertial measurement units (702G) may comprise various respective devices installed at various positions throughout the autonomous vehicle. For example, these devices may be installed along the perimeter of an autonomous vehicle to provide location awareness, collision avoidance, and other standard autonomous vehicle functionality. In some embodiments the autonomous subsystem (702) is built into the vehicle while in other embodiments the autonomous subsystem (702) comprises an aftermarket system.

Vehicular subsystem (706) is additionally included within the system. Vehicular subsystem (706) includes various anti-lock braking systems (706A), engine control units (706B), and transmission control units (706C). These components may be utilized to control the operation of the vehicle in response to the data generated by autonomous vehicle subsystem (702) and/or ADAS subsystem (704).

The processing side of the system includes one or more processors (710), short-term memory (712), an RF system (714), graphics processing units (GPUs) (716), long-term storage (718) and one or more interfaces (720).

The one or more processors (710) may comprise central processing units, FPGAs, or any range of processing devices needed to support the operations of the autonomous vehicle. Memory (712) comprises DRAM or other suitable volatile RAM for temporary storage of data required by processors (710). RF system (714) may comprise a cellular transceiver and/or satellite transceiver. Long-term storage (718) may comprise one or more high-capacity solid-state drives (SSDs). In general, long-term storage (718) may be utilized to store, for example, high-definition maps, routing data, and any other data requiring permanent or semi-permanent storage. GPUs (716) may comprise one more high throughput GPU devices for processing data received from autonomous vehicle subsystem (702A). Finally, interfaces (720) may comprise various display units positioned within the vehicle (e.g., an in-dash screen).

In one embodiment, the system additionally includes an ADAS subsystem (704) which can perform at least a portion of the operations described by the methods illustrated in the preceding figures. The ADAS subsystem (704) includes a blind spot ADAS (704a) and distance ADAS (704b) which perform blind spot algorithms to detect nearby vehicles and adjust camera field of view. The distance detection algorithms determine a distance of a nearby vehicle behind a driver's vehicle. The outputs of these systems control the components of vehicular subsystem (706). Further, the ADAS subsystem (704) includes an authentication system (704c), which may comprise higher-level software/circuitry.

Each of the devices is connected via a bus (708). In one embodiment, the bus (708) may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

Closing

The disclosure includes various devices which perform the methods and implement the systems described above, including data processing systems which perform these methods, and computer readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, "coupled to" generally refers to a connection between components, which can be an indirect communicative connection or direct communicative connection (e.g., without intervening components), whether wired or wireless, including connections such as electrical, optical, magnetic, etc.

In this description, various functions and operations may be described as being performed by or caused by software code to simplify description. However, those skilled in the art will recognize what is meant by such expressions is that the functions result from execution of the code by one or more processors, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by a computing device.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface.

Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system and the memory sub-system. The host system can further utilize an NVM Express (NVMe) interface to access memory components of the memory sub-system when the memory sub-system is coupled with the host system by the PCIe interface. The physical host interface can provide an interface for passing control, address, data, and other signals between the memory sub-system and the host system. In general, the host system can access multiple memory sub-systems via a same communication connection, multiple separate communication connections, and/or a combination of communication connections.

In one embodiment, the host system includes a processing device and a controller. The processing device of the host system can be, for example, a microprocessor, a graphics processing unit, a central processing unit (CPU), an FPGA, a processing core of a processor, an execution unit, etc. In one example, the processing device can be a single package that combines an FPGA and a microprocessor, in which the microprocessor does most of the processing, but passes off certain predetermined, specific tasks to an FPGA block. In one example, the processing device is a soft microprocessor (also sometimes called softcore microprocessor or a soft processor), which is a microprocessor core implemented using logic synthesis. The soft microprocessor can be implemented via different semiconductor devices containing programmable logic (e.g., ASIC, FPGA, or CPLD).

In some examples, the controller is a memory controller, a memory management unit, and/or an initiator. In one example, the controller controls the communications over a bus coupled between the host system and the memory sub-system.

In general, the controller can send commands or requests to the memory sub-system for desired access to the memory components. The controller can further include interface circuitry to communicate with the memory sub-system. The interface circuitry can convert responses received from the memory sub-system into information for the host system. The controller of the host system can communicate with the controller of the memory sub-system to perform operations such as reading data, writing data, or erasing data at the memory components and other such operations.

In some instances, a controller can be integrated within the same package as the processing device. In other instances, the controller is separate from the package of the processing device. The controller and/or the processing device can include hardware such as one or more integrated circuits and/or discrete components, a buffer memory, a cache memory, or a combination thereof. The controller and/or the processing device can be a microcontroller, special purpose logic circuitry (e.g., a field programmable gate array (FPGA), an application specific integrated circuit (ASIC), etc.), or another suitable processor.

The memory components can include any combination of the different types of non-volatile memory components and/or volatile memory components. An example of non-volatile memory components includes a negative-and (NAND) type flash memory. Each of the memory components can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system. Although non-volatile memory components such as NAND type flash memory are described, the memory components can be based on any other type of memory such as a volatile memory.

In some embodiments, the memory components can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components can be grouped as memory pages or data blocks that can refer to a unit of the memory component used to store data.

The controller of the memory sub-system can communicate with the memory components to perform operations such as reading data, writing data, or erasing data at the memory components and other such operations (e.g., in response to commands scheduled on a command bus by a controller). A controller can include a processing device (processor) configured to execute instructions stored in local memory. The local memory of the controller can include an embedded memory configured to store instructions for performing various processes, operations, logic flows, and routines that control operation of the memory sub-system, including handling communications between the memory sub-system and the host system. In some embodiments, the local memory can include memory registers storing memory pointers, fetched data, etc. The local memory can also include read-only memory (ROM) for storing micro-code. While the example memory sub-system includes the controller, in another embodiment of the present disclosure, a memory sub-system may not include a controller, and can instead rely upon external control (e.g., provided by an external host, or by a processor or controller separate from the memory sub-system).

In general, the controller can receive commands or operations from the host system and can convert the commands or operations into instructions or appropriate commands to achieve the desired access to the memory components. The controller can be responsible for other operations such as wear leveling operations, garbage collection operations, error detection and error-correcting code (ECC) operations, encryption operations, caching operations, and address translations between a logical block address and a physical block address that are associated with the memory components. The controller can further include host interface circuitry to communicate with the host system via the physical host interface. The host interface circuitry can convert the commands received from the host system into command instructions to access the memory components as well as convert responses associated with the memory components into information for the host system.

The memory sub-system can also include additional circuitry or components that are not illustrated. In some embodiments, the memory sub-system can include a cache or buffer (e.g., DRAM or SRAM) and address circuitry (e.g., a row decoder and a column decoder) that can receive an address from the controller and decode the address to access the memory components.

What is claimed is:

1. A method comprising:
    adjusting a field of view of a camera of a first vehicle based on a speed of the first vehicle, wherein the camera is mounted on a side of the first vehicle and collects image data for objects boated outside of the first vehicle, wherein the camera is operable to obtain image data using an automatically selectable first field of view or second field of view, and wherein the first field of view is narrower than the second field of view;
    determining whether the first vehicle is traveling faster than a predetermined speed;
    determining whether a vehicle is present on the side of the first vehicle;
    in response to determining that the first vehicle is traveling faster than the predetermined speed and determining that no vehicle is present on the side of the first vehicle, automatically selecting the first field of view of the camera and displaying, to a user of the first vehicle, image data obtained using the first field of view of the camera;
    detecting, by at least one processing device of the first vehicle, a second vehicle;
    determining, by the one processing device, whether the second vehicle is within a predetermined region relative to the first vehicle, wherein determining whether the second vehicle is within the predetermined region comprises determining whether the second vehicle is within a predetermined distance of the first vehicle; and
    in response to determining that the second vehicle is within the predetermined region, automatically selecting the second field of view of the camera and displaying image data obtained using the second field of view of the camera.

2. The method of claim 1, wherein the second field of view includes a first region on a side of the first vehicle, the first region including a region associated with a blind spot of the user when operating the vehicle.

3. The method of claim 1, wherein displaying the image data obtained using the second field of view is further responsive to determining that a speed of the second vehicle is greater than a speed of the first vehicle.

4. The method of claim 1, wherein the predetermined region is a region on the side of the first vehicle.

5. The method of claim 1, further comprising:
    determining that the second vehicle has passed the first vehicle;
    in response to determining that the second vehicle has passed the first vehicle, automatically selecting the first field of view.

6. The method of claim 1, wherein detecting the second vehicle comprises receiving, by the first vehicle, a communication from the second vehicle.

7. The method of claim 1, wherein displaying the image data obtained using the second field of view of the camera is further responsive to determining that the second vehicle is moving in a same direction as the first vehicle.

8. The method of claim 1, wherein determining whether the second vehicle is within the predetermined region further comprises determining whether the second vehicle is within a predetermined angle of view relative to a position of the camera.

9. The method of claim 8, wherein the position is a first position, and wherein determining whether the second vehicle is within the predetermined region further comprises determining whether the second vehicle is within a predetermined distance of the first position.

10. A system comprising:
    a camera mounted on a side of a first vehicle, wherein the camera is configured to collect image data regarding objects outside of the first vehicle, and further configured to automatically zoom for adjusting a field of view of the camera based at least on a speed of the first vehicle, wherein the field of view can be zoomed to at least a first field of view and a second field of view, and wherein the first field of view is narrower than the second field of view;
    a display screen positioned for viewing by a driver of the first vehicle;
    at least one processing device; and memory containing instructions configured to instruct the at least one processing device to:
    determine whether the first vehicle is traveling faster than a predetermined speed;
    determine whether a vehicle is present on the side of the first vehicle;
    in response to determining that the first vehicle is traveling faster than the predetermined speed and determining that no vehicle is present on the side of the first vehicle, automatically zoom to the first field of view of the camera and present, on the display screen, images based on data collected using the first field of view of the camera; detect a second vehicle;
    determine whether the second vehicle is within a predetermined region, wherein the second vehicle is determined to be within the predetermined region when the second vehicle is within a predetermined distance of the first vehicle; and
    in response to determining that the second vehicle is within the predetermined region, automatically zoom to the second field of view of the camera and present, on the display screen, images based on data collected using the second field of view of the camera.

11. The system of claim 10, wherein:
  detecting the second vehicle comprises receiving a communication from the second vehicle, the communication including a position of the second vehicle.

12. A non-transitory computer-readable medium storing instructions which, when executed on at least one processing device, cause the at least one processing device to at least:
  adjust a field of view of a camera of a first vehicle based at least on a speed of the first vehicle, wherein the camera is mounted on a side of the first vehicle, wherein the camera is operable to obtain image data using an automatically selectable first field of view or second field of view, and wherein the first field of view is narrower than the second field of view;
  determine whether the first vehicle is traveling faster than a predetermined speed;
  in response to determining that the first vehicle is traveling faster than the predetermined speed and determining that no vehicle is present on the side of the first vehicle, automatically select the first field of view of the camera and display, to a user of the first vehicle, image data obtained using the first field of view of the camera;
  detect a second vehicle; determine whether the second vehicle is within a predetermined region relative to the first vehicle, wherein determining whether the second vehicle is within the predetermined region comprises determining whether the second vehicle is within a predetermined distance of the first vehicle; and in response to determining that the second vehicle is within the predetermined region, automatically select the second field of view of the camera and display image data obtained using the second field of view of the camera.

\* \* \* \* \*